May 28, 1968 K. A. BRANDENBERG 3,385,322

AND VALVE FOR FLUID LOGIC CIRCUITS

Filed Jan. 25, 1966

INVENTOR
KARL A. BRANDENBERG

BY Bair, Freeman &
Molinare ATTORNEYS

United States Patent Office 3,385,322
Patented May 28, 1968

3,385,322
AND VALVE FOR FLUID LOGIC CIRCUITS
Karl A. Brandenberg, Hayward, Calif., assignor to
The Aro Corporation, Bryan, Ohio, a corporation
of Delaware
Filed Jan. 25, 1966, Ser. No. 523,507
7 Claims. (Cl. 137—625.66)

This invention relates to an AND valve unit for a fluid logic circuit mechanism of the type shown in my copending application, Ser. No. 479,758, filed Aug. 16, 1965.

One object of my present invention is to provide a special type of valve unit designed for controlling fluid logic circuits such as those powered with compressed air, oil under pressure or the like wherein the valve unit is particularly adapted for mounting on a "circuit board" which in turn is adapted to have a plurality of valve units mounted thereon and connected by means of the circuit board itself for performing various control and/or actuation duties in an assembly complex.

Another object is to provide a valve unit for fluid logic circuits which performs an "AND" function, the valve comprising a body having a pair of inlets, an outlet and an exhaust to atmosphere, together with an arrangement of operating parts such that the outlet is connected to the exhaust if both inputs are not pressurized and also if only one inlet is pressurized, the outlet is also exhausted through the inlet just mentioned if only the other inlet is pressurized, and one inlet is connected to the outlet if both inlets are pressurized.

Still another object is to provide the valve body with a face adapted to be mounted on a fluid circuit board, the pair of inlets and the outlet terminating at this face for fluid connection with the board.

A further object is to provide O-rings surrounding each of the inlets and the outlet, and sealed against the circuit board, thus establishing fluid-tight circuits relative thereto.

Still a further object is to provide the valve body formed in three parts for ready assembly, one part having a stop seat, a central part having an outlet valve seat opposite the stop seat and an exhaust valve seat, and the third part having a diaphragm chamber opposite the exhaust valve seat so that before the three parts are assembled together, a valve disc may be interposed between the stop seat and the outlet valve seat, an exhaust valve may be located in the central part for coaction with the exhaust valve seat and an actuating diaphragm may be interposed between the exhaust valve and the third part.

An additional object is to provide the exhaust valve so designed as to be actuated by the diaphragm and to actuate the valve disc.

Another additional object is to provide O-ring seals between a central part and upper and lower parts of the valve body, one O-ring seal being located radially outward of the diaphragm chamber and a passageway from the central part to one of the other parts, and the other O-ring seal being located radially outward of passageways between the central part and the third part.

Still another additional object is to provide passageways from one of the inlets to the diaphragm chamber and from the outlet valve seat to the outlet which extend through two or more parts of the valve body and are provided with additional O-ring seals for those portions of the passageways which provide for fluid flow from one part to the other.

A further additional object is to provide a novel form of O-ring seal between the parts of the valve body which combines in a single element the seal for the parts relative to each other and the seals around the passageways where they extend from one part of the valve body into the other.

With these and other objects in view, my invention consists in the construction, arrangement and combination of the various parts of my AND valve for fluid logic circuits, whereby the objects above contemplated are attained, as hereinafter more fully set forth, pointed out in my claims and illustrated in detail on the accompanying drawing, wherein:

FIG. 4 is an enlarged sectional view through one of the AND valves showing it mounted on a circuit board adjacent another AND valve in a manner similar to that disclosed in my copending application above referred to;

Figure 1:
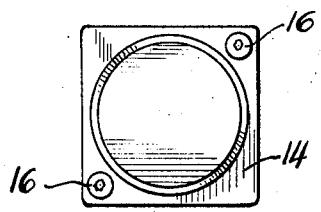
FIG. 1 is a plan view of an AND valve embodying my invention.
Figure 3:
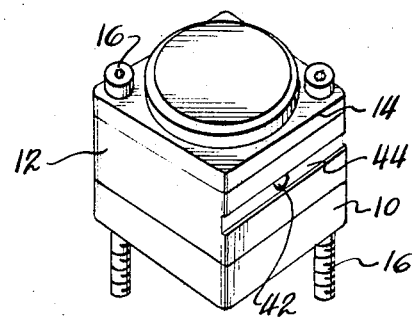
FIG. 3 is a perspective view thereof.
Figure 2:
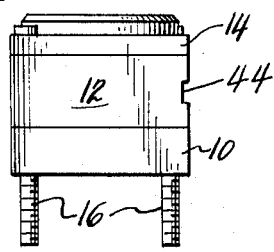
FIG. 2 is a side elevation thereof.
Figure 4:
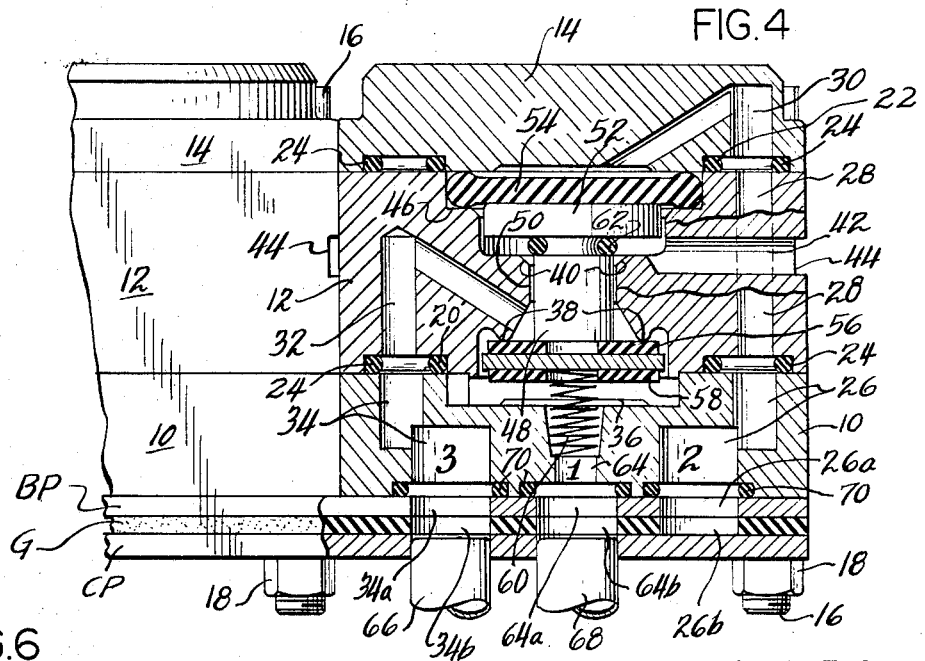
Figure 6:
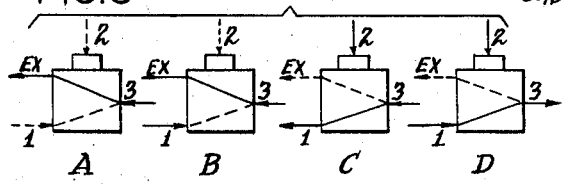
FIG. 6 is a fluid circuit diagram of an AND valve with the parts thereof in four different conditions of operation.

On the accompanying drawing I have used the reference characters BP to indicate a base plate, G a gasket and CP a cover plate of a circuit board such as disclosed in my copending application, and the numerals 1 and 2 for inlets and 3 for an outlet in FIGS. 4 and 6. The AND valve herein disclosed is in the form of a unit such as shown in FIGS. 1, 2 and 3 includes a valve body formed in three parts 10, 12 and 14.

The parts 10, 12 and 14 may be suitably secured together in leak-proof manner by clamping them together by means of screws 16 passing through suitable holes in the parts 12 and 14 and threaded through the part 10, the lower ends of the screws projecting so that the elements BP, G and CP can be mounted thereon as shown in FIG. 4 and held in position by nuts 18.

Figure 5:
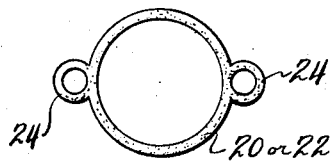
FIG. 5 is a plan view of a special type of O-ring seal at a scale of about half of FIG. 4.

In order to seal fluid circuits between the three parts, O-rings 20 and 22 are provided, and they are of special molded shape as shown in FIG. 5 with a pair of smaller O-ring elements 24 to seal around one or more passageways 26, 28, 30, 32 and 34 such as shown in FIG. 4 when the heads of the screws 16 are properly tightened down against the part 14 by screwing the screws into the part 10.

The valve body part 10 includes the two inlets 1 and 2 and the outlet 3 as illustrated in FIG. 4, and the inlet 1 terminates in a stop seat 36. The inlet 2 and the passageways 26, 28, 30 terminate at the lower surface of the body part 14 above a resilient diaphragm 54. The passageway 34, 32 from the outlet 3 terminates in an annular outlet valve seat 38 in the valve body part 12 and an opposing exhaust valve seat 40. The valve body part 12 also has an exhaust passageway 42 and an exhaust groove 44 as shown in FIG. 4, and is provided with a diaphragm chamber 46 for the diaphragm 54.

A valve stem 48 is slidable in a vertical bore 50 of the valve body part 12 and has a head 52 adapted to be engaged by the diaphragm 54 of rubber, neoprene or the like located in the diaphragm chamber 46 with its periphery sealed therein by the valve body part 14 mounted on the valve body part 12. The thickness of the diaphragm periphery is slightly greater than the vertical distance between the bottom of the diaphragm chamber 46 and the lower surface of the body part 14 so that it is normally under slight pressure to effect such seal. The lower end of the valve stem 48 carries an outlet valve disc 56 and a stop disc 58, and is normally biased upwardly by a light spring 60. The stem 48 is provided with an exhaust O-ring 62 immediately under the head 52. Thus, I provide an outlet valve disc 56 which is normally seated against the outlet valve seat 38, and the exhaust O-ring 62 is normally off the exhaust valve seat 40 when there is no pressure in either inlet 1 or 2.

The inlets 1 and 2 and the outlet 3 terminate at the lower face of the valve body part 10 so that this face is adapted to be mounted on a fluid circuit board as illustrated (specifically against the upper surface of the base plate BP) and in alignment with certain passageways 64, 64a, 64b, 26, 26a, 26b, 34, 34a and 34b, as shown in FIG. 4 which provide for circuit connections within the circuit board. By way of example, the passageway 26b may extend laterally through the gasket G from some other valve unit such as the left hand one shown in FIG. 4 whereas the passageways 34a and 34b may communicate with a pipe connection 66 and the passageways 64 and 64a may communicate with a pipe connection 68, or other pressure fluid connections may be made to the inlets and outlets as desired. By having the inlets 1 and 2 and the outlet 3 terminate at the lower face of the valve body part 10, fluid circuit connections of the type referred to are readily made and sealing can be effectively accomplished by the use of three O-rings 70. It is merely necessary to have these O-rings surround the inlets and the outlet, and resiliently engage adjacent faces of the base plate BP and the valve body part 10 as shown in my copending application.

By providing the special types of O-rings 20 and 22 shown in FIG. 5, the large circular portions thereof seal the peripheries of the outlet valve seat 38, the exhaust valve seat 40 and the diaphragm chamber 46. Between the valve body parts 10, 12 and 14 the right hand additional O-ring parts 24 seal the portions of the passageways 26, 28 and 30 which conduct fluid from the valve body part 10 through the valve body part 12 to the valve body part 14. The additional O-ring part 24 at the left on the O-ring 20 seals the passageways 32 and 34 relative to each other where fluid passes from the vave body part 12 into the valve body part 10. It will be noted the O-ring 20 utilizes both of its smaller O-ring elements 24, whereas only one of the O-rings 22 is utilized. In each instance, two of the smaller O-ring elements 24 are provided in case additional passages are required for certain types of valves thus making the special type of O-ring universally adaptable for either one or two passageway types of valves.

A valve such as herein disclosed performs and AND function. It provides a logic function in which the valve has at least two inputs and one output. The output is ON only if both inputs are ON. The output is OFF if one or both inputs are OFF.

An AND valve of the type herein disclosed simplifies the valve construction and also simplifies circuit connections when designed for mounting on a circuit board as disclosed in FIG. 4 and in the manner more fully disclosed in my copending application hereinbefore referred to when compared with an assembly of valve units piped together in the usual way. In the present disclosure the active part of the valve is a single diaphragm or the like and the device performs the following functions depending on the OFF or ON condition of the inputs 1 and 2.

If both inputs are OFF (discharged), the output is connected to exhaust (OFF). See FIG. 6A.

If input 1 alone is ON (pressurized), the outlet valve disc 56 remains in its normal position seated against the outlet valve seat 38 thereby keeping it closed which leaves the output connected to exhaust (OFF). See FIG. 6B.

If input 2 alone is ON (pressurized), the diaphragm 54 forces the head 52 and the stem 48 downwardly thereby seating the O-ring 62 against the exhaust seat 40. However, the output is still OFF because it is now connected to input 1 which is discharged. See FIG. 6C.

If inputs 1 and 2 are ON (pressurized), the diaphragm forces the O-ring 62 against the exhaust seat 40 and the disc 56 is off the seat 38 so that while the exhaust is held closed, the input 1 is in communication with the output 3 and the output is therefore pressurized (ON). See FIG. 6D.

From the foregoing description, it will be obvious that I have provided a comparatively simple valve unit adaptable for circuit board mounting which performs the AND function. The valve involves a minimum number of parts, is very simple to assemble and the mounting of the assembly on a circuit board can be accomplished with a minimum of effort.

Some changes may be made in the construction and arrangement of the parts of my AND valve for fluid logic circuits without departing from the real spirit and purpose of my invention, and it is my intention to cover by my claims any modified forms of structure or use of mechanical equivalents which may reasonably be included within their scope.

I claim as my invention:

1. An AND valve for fluid logic circuits comprising a valve body having a pair of inlets, an outlet and an exhaust passageway, an outlet valve seat for said outlet, an exhaust valve seat for said exhaust passageway, said valve seats being opposed to each other, an outlet valve for coaction with said outlet valve seat, an exhaust valve for coaction with said exhaust valve seat, one of said valves being closed against its seat when the other is spaced from its seat and vice versa, a diaphragm for actuating said valves, said diaphragm being subject to pressure from one of said inlets, the other of said inlets communicating with said outlet when said outlet valve is spaced from said outlet valve seat and cutting off flow between said other of said inlets and said outlet when said outlet valve is seated on said outlet valve seat whereby fluid pressure supplied to both of said inlets will open said outlet valve relative to said outlet valve seat and close said exhaust valve relative to said exhaust valve seat to pressurize said outlet, and fluid pressure supplied to only one of said inlets will leave said outlet connected to said exhaust passageway.

2. An AND valve for fluid logic circuits according to claim 1 wherein said valve body has a face adapted to be mounted on a fluid circuit board, said pair of inlets and said outlet terminating at said face.

3. An AND valve for fluid logic circuits according to claim 2 wherein said valve body has a sealing-ring surrounding the end of each of said pair of inlets and said outlet adjacent said face, said sealing-rings being sealed against the adjacent face of said circuit board.

4. An AND valve for fluid logic circuits according to claim 1 wherein said valve body is formed in three parts, one having said inlets and said outlet, one having both of said valve seats and the third having a passageway from said inlet to said diaphragm to cause it to close said exhaust valve and open said outlet valve upon one of said inlets being pressurized.

5. An AND valve for fluid logic circuits according to claim 4 wherein ring seals are provided between said three parts and include portions which seal passageways extending from one part into another.

6. An AND valve for fluid logic circuits according to claim 5 wherein a passageway from one of said inlets to said diaphragm extends through all three of said body parts, and an additional ring seal is provided for that portion of said passageway which provides for fluid flow between said three parts.

7. An AND valve for fluid logic circuits according to claim 6 wherein the ring seals of claim 5 and the additional ring seal of claim 6 are combined in a single element.

References Cited

UNITED STATES PATENTS

| | | | |
|---|---|---|---|
| 3,107,693 | 10/1963 | Puster et al. | 137—625.66 |
| 3,316,938 | 5/1967 | Fedoseev et al. | 137—625.66 |
| 3,326,239 | 6/1967 | Saint-Joanis et al. | 137—625.66 |

HENRY T. KLINKSIEK, *Primary Examiner.*

R. J. MILLER, *Assistant Examiner.*